Patented Dec. 6, 1932

1,890,246

UNITED STATES PATENT OFFICE

EDGAR C. BRITTON AND RAY D. HOLMES, OF MIDLAND, MICHIGAN, ASSIGNORS TO THE DOW CHEMICAL COMPANY, OF MIDLAND, MICHIGAN, A CORPORATION OF MICHIGAN

PROCESS FOR SEPARATING N-MONOALKYL AND N-DIALKYL AROMATIC AMINES OF THE BENZENE SERIES

No Drawing. Application filed April 13, 1928. Serial No. 269,861.

As prepared by the usual methods, the dialkylated aniline derivatives, such as dimethyl aniline, diethyl aniline, dimethyl p-toluidine, dimethyl p-phenylene diamine, etc., contain also some mono-alkylated aniline derivative. These mono-alkylated derivatives although not detrimental in all usages in which the dialkyl anilines are employed in the arts, are, however, harmful in some cases, and must be removed for such usage. For instance, if mono-methyl aniline be present in dimethyl aniline to the extent of over 1%, the preparation of nitroso dimethyl aniline therefrom is unsatisfactory due to the presence in the product of N-nitroso methyl aniline; and such raw material is unsuitable for this purpose unless in some manner purified.

In our pending application filed September 23, 1927, Serial No. 221,612, we disclose an improved method or process for separating mono- and di-alkyl anilines, which comprises treating the mixed anilines with an acid anhydride capable of reacting to a substantial extent with one such aniline only to form a corresponding acid anilid, and separating the latter from the other aniline. The anhydride preferred for use in such process is phthalic anhydride, although other anhydrides are referred to in said application as having the characteristic of thus reacting preferentially with a mono-alkyl aniline and so adapted for utilization in the manner described and claimed in said application. We have now discovered that not only will phthalic anhydride serve the desired purpose, but also phthalic acid, as well as certain other acids; which, in other words, it has been found will thus react with the mono-alkyl aniline in preference to the corresponding di-alkyl aniline. We have also discovered that reagents having the characteristics in question may be employed to separate derivatives of such mono- and di-alkyl anilines as well as the anilines themselves.

To the accomplishment of the foregoing and related ends, the invention, then, consists of the features hereinafter fully described, and particularly pointed out in the claims, the following description setting forth in detail certain procedure in the application of the invention, such being illustrative, however, of but a few of the various ways in which the principle of the invention may be employed.

Referring by way of illustration to the use of phthalic acid, $C_6H_4(CO_2H)_2$, the alkyl anilines to be separated are heated with the acid, as the result of which the latter reacts with mono-alkyl aniline to form mono-N-alkyl-phthalanilic acid, as may be represented by the following equation:—

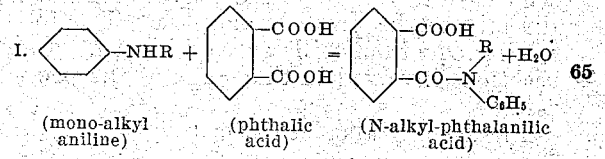

(mono-alkyl aniline)　(phthalic acid)　(N-alkyl-phthalanilic acid)

The resulting acid may be readily separated from the unreacted di-alkyl aniline in various ways as well be described more in detail. A small amount of di-N-alkyl-phthalanilic acid may also form, but this compound is easily separated from the di-alkyl aniline by distillation.

These mono-N-alkyl-phthalanilic acids are generally syrupy liquids which are difficult to obtain in pure form, becoming waxy on cooling. Having a free carboxyl group present, they can, however, be separated from the di-alkyl aniline by forming their alkali metal salts, the following equation illustrating the reaction where caustic soda is thus used:—

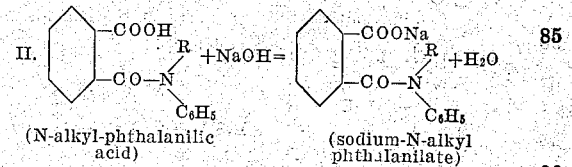

(N-alkyl-phthalanilic acid)　(sodium-N-alkyl phthalanilate)

Such resulting phthalanilate salts are soluble in water and insoluble in the di-alkyl anilines, this characteristic affording one method of separation. The di-alkyl anilines have, further, a very much lower boiling point than the phthalic acid derivative mentioned and may be easily and completely separated by distillation without washing out the mono-N-alkyl-phthalanilic acid. The characteristic affords a second method of separating the compounds in question. Or, if desired, the di-alkyl aniline may be steam distilled from the phthalic acid derivative. As a result of any of these procedures for separating the di-alkyl aniline from the phthalic acid derivative, a pure di-alkyl aniline is produced.

In addition to the above mentioned procedures which may be practiced, further treatment of the phthalic acid derivative may be carried out for the purpose of producing pure mono N-alkyl aniline as well as recovering phthalic acid. Where the anhydride is used as the reagent in the first described step of the present process, such anhydride is converted to phthalic acid, in which form it is recovered, and we had previously regarded it as necessary to reconvert the acid back to anhydride form for reuse, but all of this is eliminated in the present improved process.

The N-alkyl-phthalanilic acids may be hydrolyzed readily by aqueous acid, or the alkali salt solutions of the phthalanilic acids may be hydrolyzed by boiling with excess alkali, producing a mono-alkyl aniline, which may be recovered pure, and the phthalic acid, which we have now found may be returned directly to the process for reuse. The following equations will serve to illustrate the reactions involved in this stage of the process:—

First, using alkali solution:

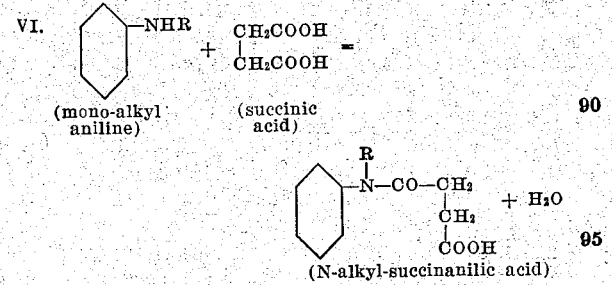

Second, using acid solution:

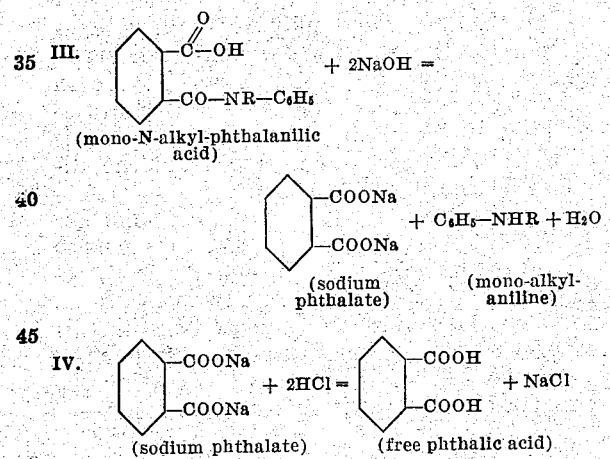

Either of these two methods of hydrolysis of the N-alkyl-pththalanic acid may be practiced as seems advisable and the acid hydrolysis can be carried out very readily with quite dilute acid, or desirably with 50 per cent. sulphuric acid at about 100° C. In all of the foregoing equations, it will be understood that "R" represents an alkyl group.

As hereinbefore indicated, other carboxylic acids, in addition to phthalic acid, have the characteristic of reacting with a mono-alkyl alinine to form an acid corresponding with mono-N-alkyl-phthalanilic acid and so may be utilized in the manner hereinbefore set forth for effecting the separation of such mono-alkyl aniline from di-alkyl aniline. As examples of such other acids, succinic acid $C_2H_4.(CO_2H)_2$, and maleic acid, $C_2H_2(COOH)_2$, may be cited.

The following equation corresponding with equation I illustrates the reaction with mono-alkyl aniline where succinic acid is thus used instead of phthalic acid:

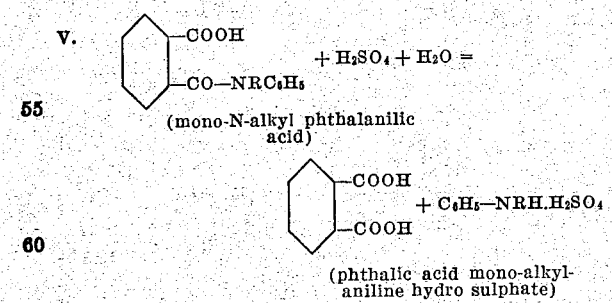

From the foregoing description it will be seen that the process is readily adapted for separating di-alkyl aniline from mono-alkyl aniline, or vice versa, in order to make either the pure mono- or di-compound, i. e., the process may be regarded as one for purifying either such compound by removing the other. The process is, moreover, inexpensive to carry out and is nevertheless capable of producing these anilines in a state of greater purity than heretofore attainable.

It will be understood that, as fully set forth in our pending application Serial No. 221,612, filed September 23, 1927, the anhydrides of the acids named, and particularly phthalic anhydride and succinic anhydride, react preferentially with the mono-alkyl aniline just as do the acids themselves, although as heretofore pointed out, the use of the acid instead of the anhydride simplifies the process and presents other advantages. Accordingly, the term dicarboxylic "acid" as used in the following claims should be understood to connote a dicarboxylic acid capable of reacting with a N-monoalkyl aromatic amine of the benzene series but incapable of reacting with a corresponding N-dialkyl amine. It will similarly be understood that derivative compounds of mono and di-alkyl aniline may be separated in accordance with the present improved procedure just as such anilines themselves.

As illustrative examples showing suitable proportions of reacting ingredients, the following may be cited:

(1) 300 grams of dimethyl aniline containing 1.2 per cent. of mono-methyl aniline were heated for four hours at a temperature of 100° to 200° C. with 12 grams of phthalic acid. After reaction the dimethyl aniline was distilled off, giving 288 grams of product, freezing point 2.2° C. The residue was then treated with the theoretical amount of caustic soda solution and the occluded dimethyl aniline steam distilled off. The residual solution was then boiled with excess caustic alkali solution and 3 grams of mono-methyl aniline were recovered. This alkaline solution was then treated with excess hydrochloric acid and 11 grams of phthalic acid were recovered.

(2) 300 grams of dimethyl aniline containing 1.2 per cent. of mono-methyl aniline were heated for four hours at a temperature of 100° to 200° C. with 12 grams of phthalic acid. The reaction product was then treated with the theoretical amount of caustic soda in 10 per cent. solution and the dimethyl aniline was separated and distilled. The sodium phthalanilate solution was treated as above.

The yield of dimethyl aniline was 280 grams, freezing point 2.2° C.

The yield of mono-methyl aniline was 3 grams.

The recovered phthalic acid was 11 grams.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. A process for separating N-monoalkyl and N-dialkyl aromatic amines of the benzene series from a mixture thereof, which comprises reacting at a temperature between about 100° and about 200° C. the N-monoalkyl aromatic amine with a dicarboxylic acid and separating the unreacted N-dialkyl aromatic amine from the reaction mixture.

2. A process for separating N-monoalkyl and N-dialkyl aromatic amines of the benzene series from a mixture thereof, which comprises reacting at a temperature between about 100° and about 200° C. the N-monoalkyl aromatic amine with a dicarboxylic acid in the absence of a solvent and separating the unreacted N-dialkyl aromatic amine from the reaction mixture.

3. A process for separating N-monalkyl and N-dialkyl aromatic amines of the benzene series from a mixture thereof, which comprises reacting at a temperature between about 100° and about 200° C. the N-monoalkyl aromatic amine with a dicarboxylic acid in the absence of a solvent, distilling the unreacted N-dialkyl aromatic amine from the reaction mixture, hydrolyzing the residue from the distillation to liberate free N-monoalkyl aromatic amine, and separating the latter from the hydrolysis mixture.

4. A process for separating N-monoalkyl and N-dialkyl aromatic amines of the benzene series from a mixture thereof, which comprises reacting the N-monoalkyl aromatic amine with a dicarboxylic acid at a temperature between about 100° and about 200° C. in the absence of a solvent, distilling the unreacted N-dialkyl aromatic amine from the reaction mixture, hydrolyzing the residue from the distillation with an aqueous alkaline solution and separating the N-monoalkyl aromatic amine from the hydrolysis mixture.

5. A process for separating N-monoalkyl and N-dialkyl anilines from a mixture thereof, which comprises reacting at a temperature between about 100° and about 200° C. the N-monoalkyl aniline with phthalic acid and separating the unreacted N-dialkyl aniline from the reaction mixture.

6. A process for separating N-monoalkyl and N-dialkyl anilines from a mixture thereof, which comprises reacting at a temperature between about 100° and about 200° C. the N-monoalkyl aniline with phthalic acid in the absence of a solvent and separating the unreacted N-dialkyl aniline from the reaction mixture.

7. A process for separating N-monoalkyl and N-dialkyl anilines from a mixture thereof, which comprises reacting at a temperature between about 100° and about 200° C. the N-monoalkyl aniline with phthalic acid in the absence of a solvent, distilling the unreacted N-dialkyl aniline from the reaction mixture, hydrolyzing the residue from the distillation to liberate free N-monoalkyl aniline, and separating the latter from the hydrolysis mixture.

8. A method for separating N-monoalkyl and N-dialkyl anilines from a mixture thereof, which comprises reacting the N-monoalkyl aniline with phthalic acid at a temperature between about 100° and about 200° C. in the absence of a solvent, distilling the unreacted N-dialkyl aniline from the reaction mixture, hydrolyzing the residue from the distillation with an aqueous alkaline solution, and separating the N-monoalkyl from the hydrolysis mixture.

9. A process for separating N-monomethyl and N-dimethyl anilines from a mixture thereof, which comprises reacting at a temperature between about 100° and about 200° C. the N-monomethyl aniline with phthalic acid and separating the unreacted N-dimethyl aniline from the reaction mixture.

10. A process for separating N-monomethyl and N-dimethyl anilines from a mixture thereof, which comprises reacting at a temperature between about 100° and about 200° C. the N-monomethyl aniline with phthalic acid in the absence of a solvent and separating the unreacted N-dimethyl aniline from the reaction mixture.

11. A process for separating N-monomethyl and N-dimethyl anilines from a mixture thereof, which comprises reacting the N-monomethyl aniline with phthalic acid at a temperature between about 100° and about 200° C. in the absence of a solvent, distilling the unreacted N-dimethyl aniline from the reaction mixture, hydrolyzing the residue from the distillation to liberate free N-monomethyl aniline, and separating the latter from the hydrolysis mixture.

12. A process for separating N-monoethyl and N-diethyl anilines from a mixture thereof, which comprises reacting at a temperature between about 100° and about 200° C. the N-monoethyl aniline with phthalic acid and separating the unreacted N-diethyl aniline from the reaction mixture.

13. A process for separating N-monoethyl and N-diethyl anilines from a mixture thereof, which comprises reacting the N-monoethyl aniline with phthalic acid in the absence of a solvent and separating the unreacted diethyl aniline from the reaction mixture.

14. A process for separating N-monoethyl and N-diethyl anilines from a mixture thereof, which comprises reacting the N-monoethyl aniline with phthalic acid at a temperature between 100° and 200° C. in the absence of a solvent, distilling the unreacted N-diethyl aniline from the reaction mixture, hydrolyzing the residue from the distillation to liberate free N-monoethyl aniline, and separating the latter from the hydrolysis mixture.

Signed by us, this 10th day of April, 1928.

EDGAR C. BRITTON.
RAY D. HOLMES.